Oct. 29, 1940.    R. A. SHELLABARGER    2,219,638
CHECKROW CORN PLANTER ATTACHMENT
Filed March 4, 1939    2 Sheets-Sheet 1

Inventor
R. A. Shellabarger
By Clarence A. O'Brien
and Hyman Berman
Attorneys

Oct. 29, 1940.   R. A. SHELLABARGER   2,219,638
CHECKROW CORN PLANTER ATTACHMENT
Filed March 4, 1939   2 Sheets-Sheet 2

Inventor
R. A. Shellabarger
By Clarence A. O'Brien
and Hyman Berman
Attorneys

Patented Oct. 29, 1940

2,219,638

UNITED STATES PATENT OFFICE 2,219,638

CHECKROW CORN PLANTER ATTACHMENT

Rolla A. Shellabarger, Mattoon, Ill.

Application March 4, 1939, Serial No. 259,905

3 Claims. (Cl. 111—16)

The present invention relates to checkrow corn planter attachments embodying a construction adapted to drop the corn in checkrows without the use of the usual check wire.

An important object of the present invention is to provide a marking wheel mounted on the axle of the planter and operatively engaged with the usual planter wheel to rotate the marking wheel and providing a trip mechanism for the seed dispensing valve to deposit the seed at predetermined regular intervals during the movement of the planter over the ground.

A further object is to provide an indicator or pointing attachment for the planter to indicate the last position at which the seed was dropped before the planter is turned at the end of the row and after such turning movement of the planter to indicate the position at which the last seed was deposited, in order that the marking wheel may be adjusted relative to the ground wheel to properly begin the marking operation during the return trip of the planter over the field.

An additional object is to provide a seed planter attachment of this character of simple and practical construction, which is efficient and reliable in performance, relatively inexpensive to manufacture and install in operative position and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which—

Figure 1:
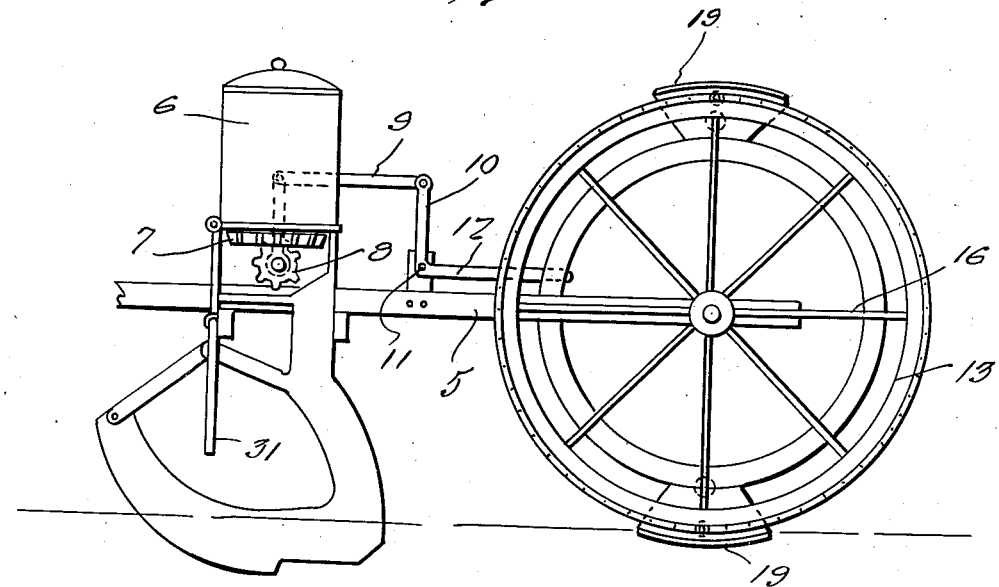
Figure 1 is a side elevational view.
Figure 2:
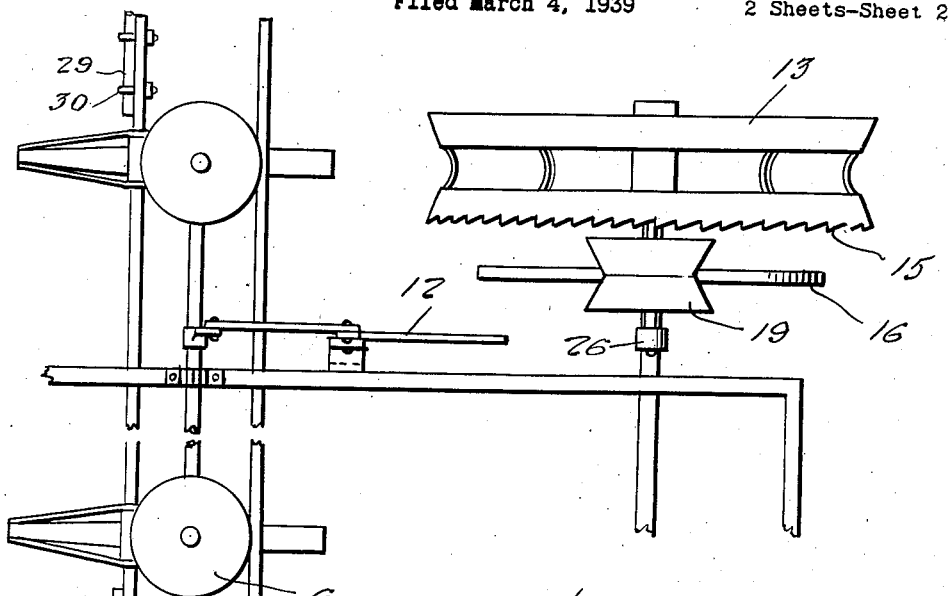
Figure 2 is a top plan view with parts broken away and showing the right hand marker and also showing the pointer projecting from the left hand edge of the planter.
Figure 4:
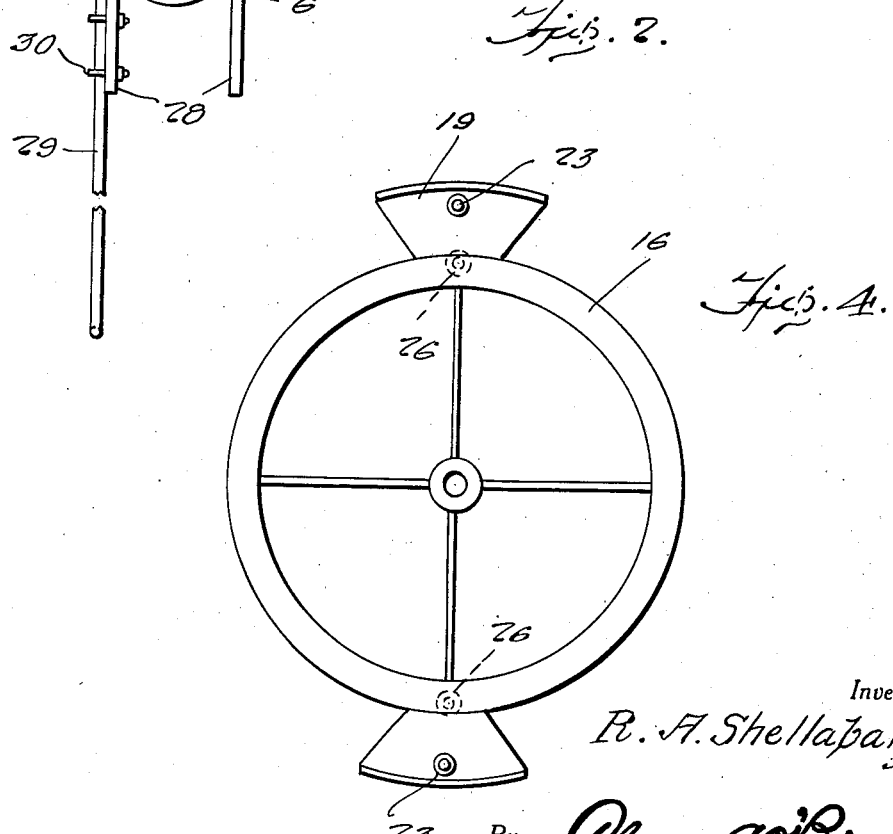
Figure 4 is a side elevational view of the marker wheel.

Referring now to the drawings in detail, the numeral 5 designates the planter frame on which the seed box or hopper 6 is mounted toward the forward end thereof and provided with the usual seed dispensing or control mechanism 7 operated by means of a gear 8 through a trip mechanism 9 which includes a bell crank lever 10 pivoted intermediate its end at 11 and having one end free as shown at 12 and projecting rearwardly, as more clearly shown in Figures 1 and 2 of the drawings.

The rear of the frame is supported upon ground wheels 13 journalled on an axle 14, the inner edge of one of the wheels, preferably the right hand wheel being provided with a toothed edge 15, said teeth being inclined in a forward direction.

Figure 3:
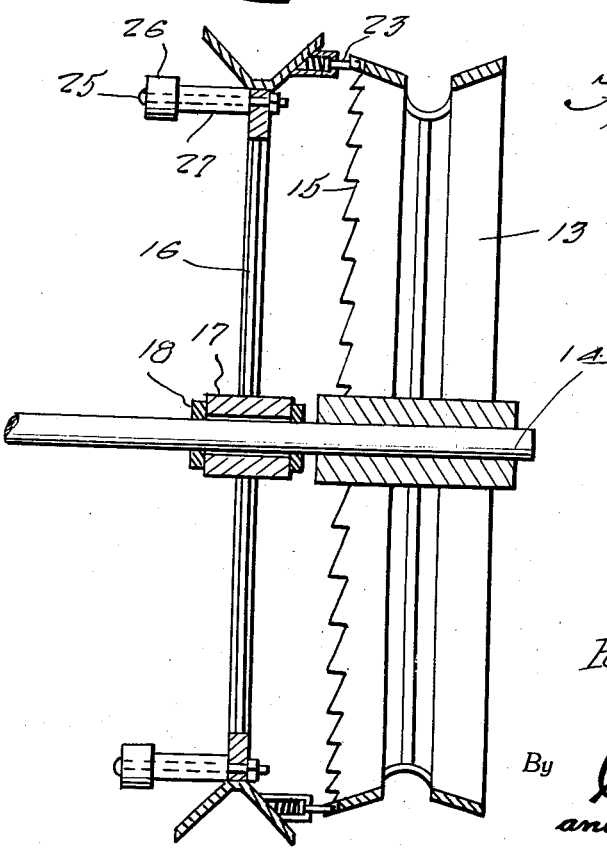
Figure 3 is a vertical transverse sectional view through the ground and marking wheels.
Figure 5:
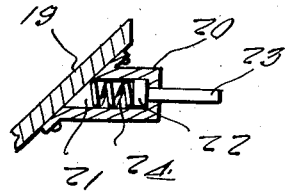
Figure 5 is a detail of the spring projected dog forming the operative engagement with the toothed edge of the ground wheel.

Also freely mounted on the axle 14 is a marking wheel 16 which includes a hub 17 adapted for longitudinal sliding movement on the axle and secured against idle sliding movement by friction washers 18 engaging each end of the hub as clearly shown in Figure 3 of the drawings.

At diametrically opposite sides of the wheel 16 is a pair of marking elements 19 projecting radially from the peripheral edge of the wheel and preferably of V-shaped formation in cross section. Secured to the outer edge of the markers is a bracket 20 having a chamber 21 formed therein and within which is slidably mounted the head 22 on a dog 23 projecting outwardly from the bracket for engagement with the teeth 15 of the wheel 13. A coiled spring 24 is positioned in the chamber for yieldably urging the dog in outwardly projected position.

Projecting from the side of the wheel 16 opposite from the dog 23 is a pin 25 having a roller 26 journalled thereon and spaced from the wheel by a sleeve 27.

The rearwardly extending end 12 of the bell-crank 10 of the trip mechanism is positioned in the path of the rollers 26 for engagement thereby during the rotation of the wheel 16.

The seed boxes or hoppers 6 are supported on a pair of spaced parallel transversely extending frame members 28 and to each end of one of these transverse frame members is pivotally secured one end of a pointer arm 29 by means of U-bolts 30, the arm projecting transversely beyond the ends of the frame members 28 and being provided at its outer end with a down-turned pointing or indicating finger 31, terminating slightly above the ground as clearly illustrated in Figure 1 of the drawings. The pivotal connection for the arms enables the pointing fingers to be raised upwardly out of the way of obstructions, when not in use.

Accordingly, in the operation of the device, as the planter is moved over the ground, the markers 19 will mark the position at which the grain has been dropped from the hopper 6 and the roller 26 carried by the wheel 16 will operate the trip mechanism to release the seed at proper intervals to deposit the same in the ground.

When the end of the row has been reached, and the planter turned to make its return trip across the field, the downturned finger 31 of the pointer 29 is located over the place where the last seed has been dropped before the turning of the planter. Such place will be indicated by the imprint in the ground made by the marker 19, at the place where the last seed was dropped. The operation of the down finger is not put in use until after the planter has been turned around.

After the down finger 31 is placed directly above the last hill made before turning around, then the first hill is planted by the manual operation of the rotating wheel 16 while the planter is stopped, and before the planter starts across the field. It will be apparent that the spring projected dogs 23 permit the free rotation of the marker in one direction by passing over the teeth 15 while said teeth operate to engage the dogs for rotating the marker wheel during a forward movement of the planter.

It is believed the details of construction and manner of operation of the device will be readily understood from the foregoing without further detailed explanation.

Having thus described the invention, what I claim is—

1. In combination, a checkrow planter comprising a frame having a seed hopper provided with a dispensing valve, an axle carried by the frame, a ground wheel journaled on the axle and having a toothed side edge, said teeth being inclined in a forward direction, a marking wheel journaled on the axle, a pair of marking elements projecting radially from the marking wheel at diametrically opposite sides thereof, spring projected dogs carried by said marking elements and engageable with the teeth of said ground wheels for rotating said wheels as a unit during forward movement of the planter, a trip mechanism for the seed dispensing valve of the planter and a plurality of trip rollers carried by the marking wheel for actuating said trip mechanism.

2. In combination, a checkrow planter comprising a frame having a seed hopper provided with a dispensing valve, an axle carried by the frame, a ground wheel journaled on the axle and having a toothed side edge, said teeth being inclined in a forward direction, a marking wheel journaled on the axle, a pair of marking elements projecting radially from the marking wheel at diametrically opposite sides thereof, spring projected dogs carried by said marking elements and engageable with the teeth of said ground wheels for rotating said wheels as a unit during forward movement of the planter, a trip mechanism for the seed dispensing valve of the planter and a plurality of trip rollers carried by the marking wheel for actuating said trip mechanism and an indicating arm projecting laterally from one side of the frame and having a downwardly extending indicating finger terminating in spaced relation above the ground.

3. In combination, a checkrow planter comprising a frame having a seed hopper provided with a dispensing valve, an axle carried by the frame, a ground wheel journaled on the axle and having a toothed side edge, said teeth being inclined in a forward direction, a marking wheel journaled on the axle, a pair of marking elements projecting radially from the marking wheel at diametrically opposite sides thereof, spring projected dogs carried by said marking elements and engageable with the teeth of said ground wheels for rotating said wheels as a unit during forward movement of the planter, a trip mechanism for the seed dispensing valve of the planter and a plurality of trip rollers carried by the marking wheel for actuating said trip mechanism and an indicating arm projecting laterally from one side of the frame and having a downwardly extending indicating finger terminating in spaced relation above the ground, said arm being pivotally connected to the frame whereby the indicating finger is adapted to be raised above the frame when not in use.

ROLLA A. SHELLABARGER.